June 18, 1929.　　　D. O. WHEELOCK　　　1,717,592
COOKING APPARATUS
Filed March 15, 1926　　　3 Sheets-Sheet 2

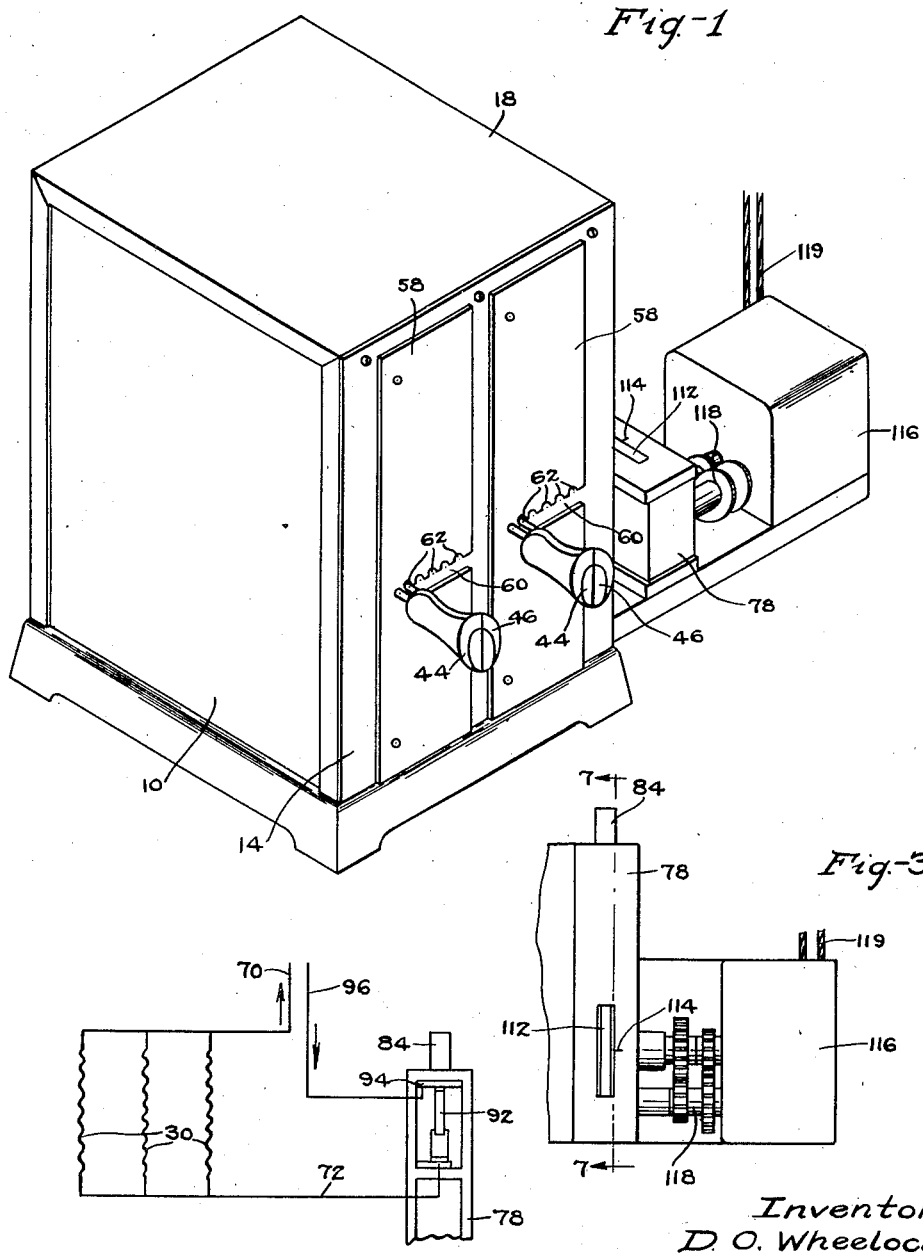

Inventor
D. O. Wheelock.
By Whiteley and Ruckman
Attorneys.

June 18, 1929. D. O. WHEELOCK 1,717,592
COOKING APPARATUS
Filed March 15, 1926 3 Sheets-Sheet 3

Inventor
D. O. Wheelock
By Whiteley and Ruckman
Attorneys

Patented June 18, 1929.

1,717,592

UNITED STATES PATENT OFFICE.

DICKINSON O. WHEELOCK, OF MILLER, SOUTH DAKOTA; E. F. WHEELOCK, EXECUTOR OF SAID DICKINSON O. WHEELOCK, DECEASED, ASSIGNOR TO EDWIN M. WHEELOCK AND ALEXANDER D. ROBERTSON, BOTH OF MINNEAPOLIS, MINNESOTA.

COOKING APPARATUS.

Application filed March 15, 1926. Serial No. 94,792.

My invention relates to cooking apparatus, and while intended more particularly for use in broiling meat, fish, and other articles of food, certain features of the invention are capable of use for general cooking purposes. One object of the invention is to provide an apparatus in which the material being cooked is subjected to heat which is automatically cut off when the material has been subjected to a predetermined amount of heating medium. Another object is to provide an electrical cooking apparatus having a cut-off mechanism operated by a motor whose speed is dependent upon the volume of current supplied thereto from a source of electrical energy which also furnishes current to the heating elements of the cooker so that as the current for heating increases, the timing will be correspondingly decreased and vice versa, thereby causing the material to be subjected to the same amount of heat for any particular setting regardless of fluctuations in the current. Another object is to provide a casing provided with an opening in combination with a food holder which is constructed to close the opening when the holder is inserted into the casing. Another object is to provide a holder having a basting device carried thereby. Another object is to provide a holder having a drip trough carried thereby. Another object is to provide a two-part holder having a drip trough attached to one of the parts and so arranged that the contents of the trough will be retained when the holder is laid on its side. Another object is to provide a holder in which the material may be held in clamped condition for different thicknesses of the material.

The full objects and advantages of my invention will appear in connection with the detailed description thereof, and the novel features of my inventive idea will be particularly pointed out in the claims.

Figure 4:
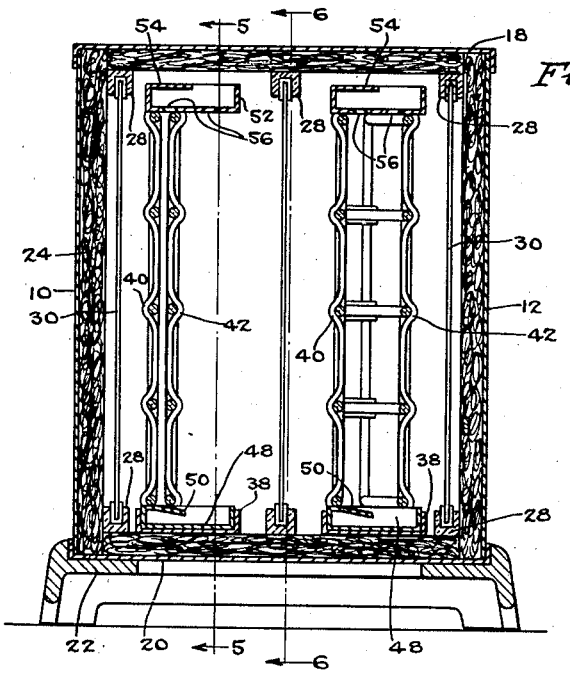
Figure 5:
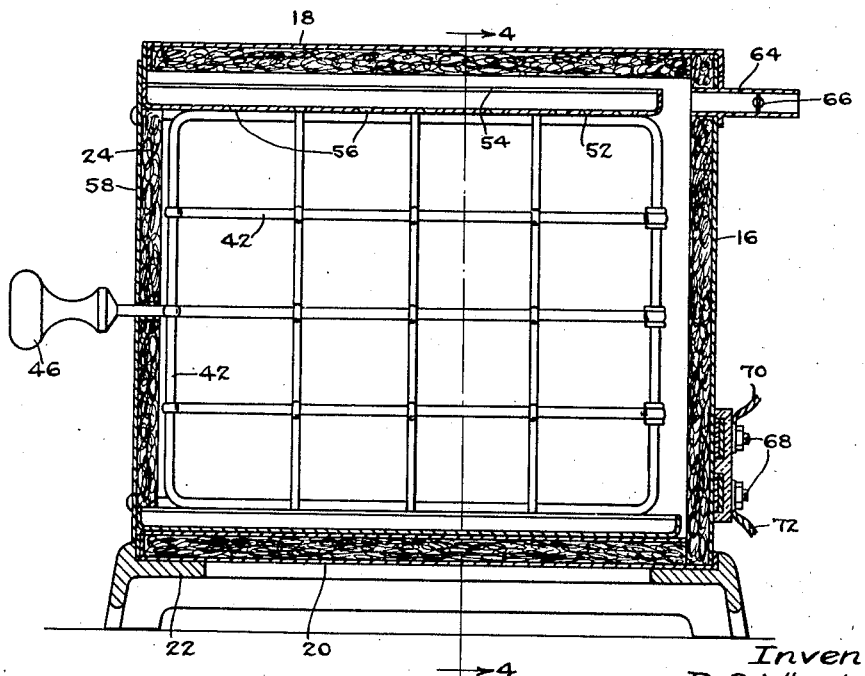
Figure 6:
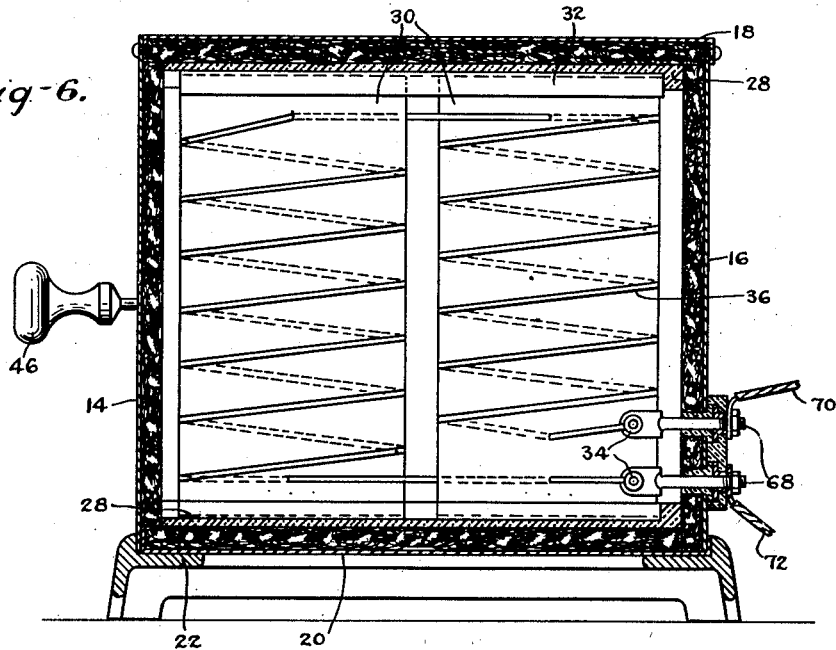
Figure 7:
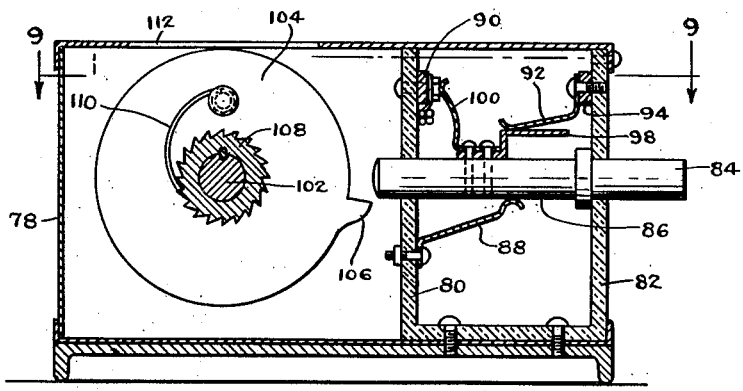

In the accompanying drawings which illustrate my invention,—Fig. 1 is a perspective view of the apparatus. Fig. 2 is a wiring diagram. Fig. 3 is a fragmentary plan view. Fig. 4 is a view in vertical section on the line 4—4 of Fig. 5. Fig. 5 is a view in vertical section on the line 5—5 of Fig. 4. Fig. 6 is a view in vertical section on the line 6—6 of Fig. 4. Fig. 7 is a view in vertical section on the line 7—7 of Fig. 3.

As shown in the drawings, I provide a sheet metal casing having two end walls 10 and 12, a front wall 14, a rear wall 16, a top 18, and a bottom 20 which rests upon a base 22. The casing is lined with fibrous insulating material 24. Fiber strips 28 are secured within the top and bottom of the casing adjacent the end walls and middle and these fiber strips are channeled to provide slideways for heating elements, each of which as best shown in Fig. 6, consists of a pair of mica sheets 30 held together in spaced relation by a binding strip 32. Eyelets 34 passing through one of the sheets 30 serve for attachment of heating wires 36 which are wrapped helically on the mica and which may be supplied with current in a manner to be described later. As will be understood from Figs. 1 and 4, the front wall 14 is provided with slots through which food holders may be inserted by sliding them on channel-like guides 38 secured in the bottom portion of the casing. Each holder consists of two rib members 40 and 42 which are hinged together at the rear so that they may be readily opened and closed, the extent of closing depending upon the thickness of the meat or other food product which is clamped. In Fig. 4, the holder at the right hand is shown in the position which it occupies for thick pieces of meat or other material while the other holder is shown arranged for holding comparatively thin pieces. In order to manipulate the holder, handle members 44 and 46 are secured to the front of the grids 40 and 42, respectively. These two handle members are complementary so that together they form a complete or rounded handle. Trough members are secured to one of the grid members as, for instance, the grid member 40 at the top and bottom thereof. The bottom trough member 48 is of such width as to slide smoothly in the guide 38 which maintains the holder in upright position when placed in the casing. The trough member 48 is for the purpose of catching the juices of the meat. In order that the holder may be laid on its side and opened without spilling the juices, the trough member 48 is provided with a top portion 50 extending part way over the same. The top trough member 52 is provided with a similar top portion 54. The trough member 52 is for basting purposes and, hence, is provided with perforations 56 in its bottom in order that butter or other basting material may drip down over the meat while being broiled. Also secured to each grid member 40 there is a front plate 58 which on its rear is covered with fibrous insulating material. This front plate is provided with a horizontal slot 60, one edge of which has a series of notches 62 adapted to be engaged by the shank of the handle member 46 for the purpose of holding the grids in clamping position regardless of the thickness of material which is held. At the rear of the casing, it is provided with a vent tube 64 containing a damper 66. By referring to Fig. 6, it will be seen that the eyelets 34 are connected to bolts 68 to which insulated wires 70 and 72 are secured, one of which constitutes a lead and the other a return. A switch is contained in a small casing 78 placed adjacent one end of the main casing. The casing 78 includes a support of fibrous material having two spaced vertical members 80 and 82. In the embodiment shown, there is a rod 84 slidably and non-rotatably mounted in these members. This rod contains a notch 86 in its lower side adapted to be engaged by the end of a spring 88 for holding the rod when it is pushed inwardly from the position shown in Fig. 7. The support 80 carries a contact member 90 to which the wire 70 is connected. The support 82 carries a spring contact finger 92 connected to a metal bar 94 to which a feed wire 96 is connected. The rod 84 carries two contact fingers 98 and 100 secured to its upper surface, these fingers being united or in contact with each other. The finger 96 is always in sliding contact with the finger 92 while the finger 100 engages the contact member 90 only when the rod 84 is pushed in. It is apparent, therefore, that pushing in of the rod 84 will cause current to be supplied to the heating elements. Mounted in the casing 78 beyond the inner end of the rod 84 there is a shaft 102 upon which a disk 104 is loosely mounted. This disk carries an outstanding cam 106 which during the rotation of the disk engages the inner end of the rod 84 and retracts the finger 100 from engagement with the contact member 90. A ratchet wheel 108 is secured to the shaft 102 adjacent the disk 104. A spring 110 is secured at one end to the disk and at the other end engages the teeth of the ratchet wheel so that when the shaft 102 is rotated, the disk will be rotated in forward direction. For setting purposes, the disk may be turned forwardly independent of the ratchet wheel. Above the disk 104, the top of the casing 78 is provided with a slot 112 at the edge of which is an indicating mark 114. The periphery of the disk 104 is provided with indications which may be made to register with the mark 114 when the disk is rotated. These indications may consist of numbers or may consist of words such as "Well done", "Medium", and "Rare". It is obvious that the disk 104 in Fig. 7 occupies "Well done" position in which the cam 106 is close to the rod 84. For "Medium" position, the disk will be given a partial rotation in clockwise direction, while for "Rare" position, the disk will be further rotated in the same direction. In order to cut off the supply of heat, the shaft 102 may be rotated in any suitable manner. As shown in Fig. 1, the shaft of an electric motor 116 is connected through reduction gearing 118 with the shaft 102. It will be understood that the motor may be supplied with current through a lead wire 119 connected with the same source of electrical energy which supplies the feed wire 96 for the heating elements. The motor 116 is of a type such that its speed is dependent upon the volume of current. This motor may be a well known variable speed motor and, hence, need not be described in detail. As the current increases, the heat supplied by the heating elements is increased, and, at the same time, the speed of the motor is increased so that the time the current is on will be decreased in proportion as the current increases.

The operation and advantages of my invention will now be understood when the construction previously described is kept in mind. When the apparatus is not in operation, the switch will be open which condition occurs when the rod 84 is in the position shown in Fig. 7. When the apparatus is to be used, one or both of the holders are employed for which purpose they may be removed from the casing and opened so that material to be cooked or boiled may be laid therein. Upon closing the holder and grasping the handle members 44 and 46, the grids will be clamped down upon the material. The holder is held in the vertical position shown in Fig. 5 and pushed into the casing, the guide 38 serving to hold it in upright position. Before the operator lets go of the handle members, the shank of the handle member 46 is engaged with the proper one of the notches 62 so that the material regardless of whether it consists of thick or thin slices or pieces will be kept clamped and prevented from slumping down. The operator then places the disk 104 in position for the desired degree of cooking and pushes inwardly on the rod 84 which closes the switch and permits current to flow through the heating elements. The current will remain on until the disk 104 rotates sufficiently to cause the cam 106 to come into engagement with the inner end of the rod 84 whereupon the switch is opened. When the apparatus is used for broiling, basting material in the trough 52 will gradually run down over the surface of the meat or other material being broiled. The juices which drip from the meat are caught in the trough 48, the top member 50 being inclined so as to cause such juices to flow into the trough. When the operation is completed, the operator pulls the holder out of the casing and lays it down with the grid member 40 lowermost so that the broiled material is readily removed upon swinging the grid members 42 into open position. On account of the construction of the troughs, the juices will be retained in the trough 48 while any basting material remaining in the trough 52 will be retained therein. It will be noted that the casing may be readily removed from the base and taken apart for cleaning purposes and that the front wall 14 may be removed upon loosening a few screws so that burned-out heating elements may be readily replaced since these elements can then be slid in the fiber strips 28.

I claim:

1. Cooking apparatus comprising means for holding material to be cooked, electrical heating means associated therewith for effecting the cooking, and means for automatically turning off the electrical energy which is controlled in operation by the amount of electrical energy consumed and delivered to effect the cooking.

2. Cooking apparatus comprising means for holding material to be cooked, electrical heating means associated therewith for effecting the cooking, means for automatically turning off the electrical energy which is controlled in operation by the amount of electrical energy consumed and delivered to effect the cooking, and means for predetermining the amount of electrical energy to be consumed.

3. Electrical cooking apparatus adapted to be operated by a circuit having variable line voltage, including a means for holding material to be cooked and a heating element in said circuit associated therewith operative to generate heat when the circuit is closed, means for predetermining an amount of electrical energy to be consumed in a single cooking operation, and means for automatically opening the circuit to terminate said heat generation when said predetermined amount of electrical energy has been consumed.

4. Electrical cooking apparatus adapted to be operated by a circuit having variable line voltage, including a means for holding material to be cooked and a heating element in said circuit associated therewith operative to generate heat when the circuit is closed, means for predetermining an amount of electrical energy to be consumed in a single cooking operation, and means controlled in operation by the amount of electrical energy consumed for automatically opening the circuit to terminate said heat generation when said predetermined amount of electrical energy has been consumed.

5. Cooking apparatus comprising a holder for material to be cooked, heating means associated with said holder, means for supplying heating medium thereto, and means controlled in operation by the amount of heating medium supplied for cutting off the supply of said heating medium when a predetermined amount thereof has been supplied.

6. Cooking apparatus comprising a casing which encloses a chamber adapted to receive material to be cooked, electric heating means for said chamber controlled by a switch adapted to be closed manually, and means controlled in operation by the amount of electrical energy consumed for automatically opening the switch.

7. Cooking apparatus comprising a holder for material to be cooked, electric heating means associated therewith including a switch, a motor operative device for controlling said switch, a common source of electrical energy for the heating means and said device, the operation of said device to open the switch being controlled and determined by the amount of electrical energy consumed.

In testimony whereof I hereunto affix my signature.

DICKINSON O. WHEELOCK.